United States Patent [19]
Hashimoto

[11] Patent Number: 5,476,231
[45] Date of Patent: Dec. 19, 1995

[54] FLY TYPE FISHING REEL WHICH REDUCES PLAY BETWEEN THE SPOOL SHAFT AND SPOOL

[75] Inventor: Hiroshi Hashimoto, Tokyo, Japan

[73] Assignee: Daiwa Seiko, Inc., Tokyo, Japan

[21] Appl. No.: 188,832

[22] Filed: Jan. 28, 1994

[30] Foreign Application Priority Data

Feb. 25, 1993 [JP] Japan ................. 5-012547 U

[51] Int. Cl.⁶ ............................................. H01K 89/016
[52] U.S. Cl. ............................................ 242/318; 242/322
[58] Field of Search ................................. 242/310, 317, 242/318, 320, 322

[56] References Cited

U.S. PATENT DOCUMENTS

| | | | |
|---|---|---|---|
| 2,486,559 | 11/1949 | Fuller | 242/318 |
| 2,518,903 | 8/1950 | King | 242/318 |
| 2,598,846 | 6/1952 | Smith et al. | 242/318 |
| 3,574,339 | 4/1971 | Sarah | 242/318 X |
| 3,806,060 | 4/1974 | Valentine | 242/318 X |
| 3,989,204 | 11/1976 | Lémery | 242/318 X |
| 4,049,217 | 9/1977 | Koopman | 242/318 X |
| 4,544,114 | 10/1985 | Stauffer | 242/318 X |

FOREIGN PATENT DOCUMENTS

| | | |
|---|---|---|
| 5-12547 | 2/1993 | Japan. |
| 4391 | of 1911 | United Kingdom ............ 242/318 |

*Primary Examiner*—Joseph J. Hail, III
*Attorney, Agent, or Firm*—Longacre & White

[57] ABSTRACT

The present disclosure concerns a simple structure for a fly type fishing reel to prevent the occurrence of noise caused by axial backlash between a shaft and a spool. A spool is rotatably supported on a shaft through at least one bearing, and a peripheral groove is formed on a fore end portion of the shaft. A cap is fixed to a center of the spool with a screw. An engaging knob plate to detachably engage the spool with the shaft is provided between the cap and the spool. A concave portion is formed approximately at a center of the reverse side of the cap for accommodating the fore end portion of the shaft, and a floating absorption member is inserted into and fixed in the concave portion. The floating absorption member may be made of felt, a resilient laminated member of rubber on which a metallic plate and a synthetic resin plate are stacked, or a leaf spring.

12 Claims, 5 Drawing Sheets

FLY TYPE FISHING REEL WHICH REDUCES PLAY BETWEEN THE SPOOL SHAFT AND SPOOL

BACKGROUND OF THE INVENTION a) Field of the Invention

The invention relates to a fly type fishing reel in which a spool is relatively rotatably supported on a shaft fixed to a single side support. In particular, the present invention is directed to absorbing relative axial play between the shaft and the spool.

b) Description of Related Art

It is known to have the spool of a fly type fishing reel rotatably and detachably mounted on a shaft of a reel main body. For example, Japanese Utility Model Publication No. 3-22658 discloses such a known arrangement.

According to the teaching in the Japanese publication, a spool is relatively rotatably supported on an outer periphery of the shaft. The spool is positioned against the reel main body and retained in the axial direction along the shaft by a peripheral groove formed at a fore end of the shaft cooperating with an engaging knob plate slidably associated with the spool.

To facilitate disconnecting the shaft and spool in the known structure, it is necessary to provide a small amount of play between the width of the peripheral groove and the thickness of the engaging knob plate. Due to this play, undesirable axial backlash is caused between the peripheral groove and the engaging knob plate.

In the known structure, no consideration is given to minimizing the occurrence of backlash in the axial direction between the shaft of the reel main body and the spool to be mounted on the shaft. Therefore, unpleasant noise occurs as a consequence of the backlash during fishing.

When the dimensions of the peripheral groove width and engaging knob plate thickness are accurately controlled in order to suppress the influence of backlash, the manufacturing cost rises unacceptably.

SUMMARY OF THE INVENTION

Problems to be solved by the invention are described as follows:
1) Minimizing or eliminating noise made between the shaft and the spool as a consequence of relative play in the axial direction.
2) Eliminating the need to accurately control manufacturing dimensions of the connection between the shaft and the spool, thereby reducing production costs.

An objective of the present invention is to provide a fly type fishing reel characterized in that: play caused in the axial direction between the shaft and spool is absorbed with a simple structure, such that the occurrence of noise made by backlash is prevented.

The main point of the present invention is to provide a floating absorption member for absorbing play existing in an axial direction between a spool and a shaft of a fly type fishing reel. The floating absorption member may be provided between either the fore end or the base portion of the shaft, and the spool.

DESCRIPTION OF THE PREFERRED EMBODIMENT

The present invention is explained with reference to a first embodiment illustrated in FIGS. 1 to 5. A fly type fishing reel for fishing includes a shaft 2 fixed to, and protruding from the center of a reel main body 1.

Figure 1:
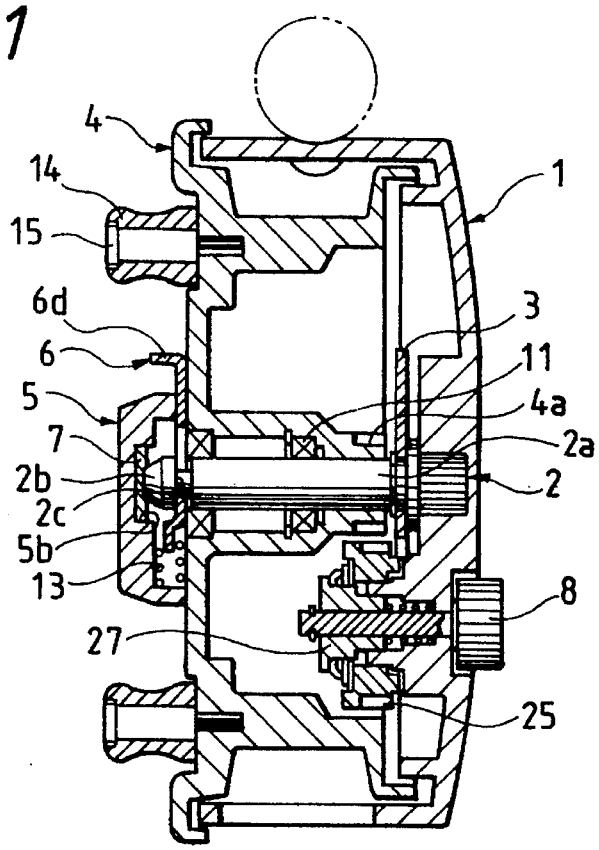
FIG. 1 is a sectional side view of a fly type fishing reel according to a first embodiment of the present invention.
Figure 3:
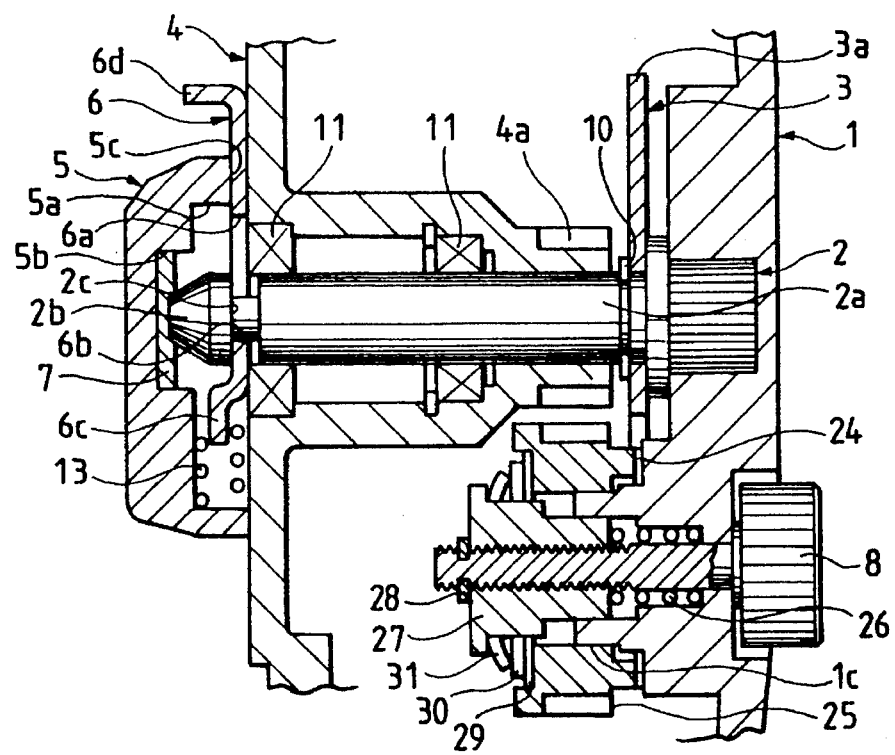
FIG. 3 is an enlarged sectional side view of an essential portion of a fly type fishing reel according to the first embodiment of the present invention.
Figure 4A:
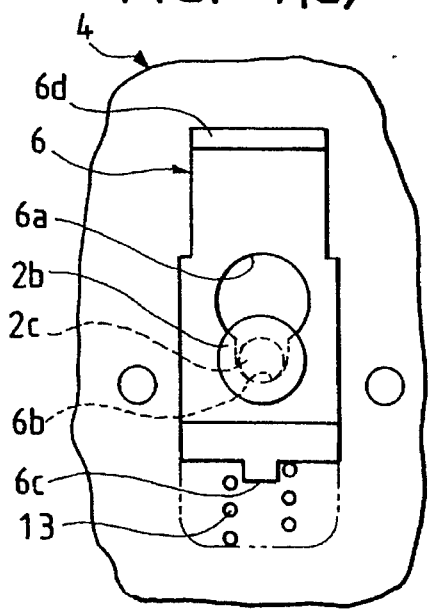
FIG. 4(a) is an enlarged front view of an engaging knob plate and a shaft from which a cap is removed from a fly type fishing reel according to the first embodiment of the present invention.
Figure 4B:
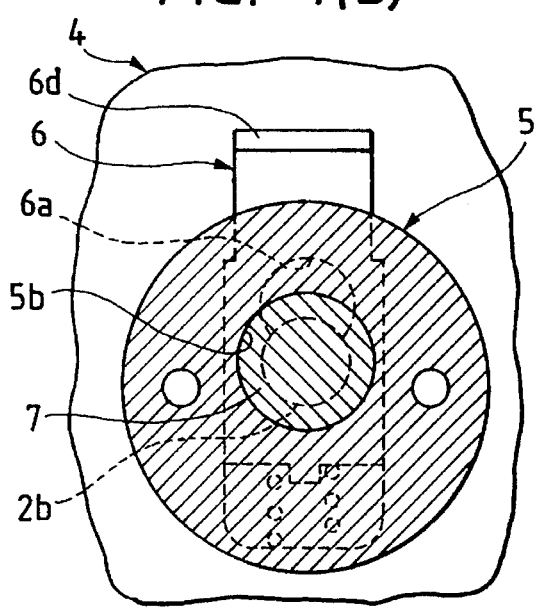
FIG. 4(b) is a front view with a section taken through a cap and a floating absorption member, showing an engaging knob plate of a fly type fishing reel according to the first embodiment.

An oscillating body 3 is pivotally supported on the outer periphery of a base portion 2a of the shaft 2. Axial movement of the oscillating body 3 away from the reel main body 1 is prevented by a retaining clip 10. A spool 4 is relatively rotatably supported on the shaft 2 by one or more bearings 11 (two are shown in FIGS. 1 and 3).

Figure 2:
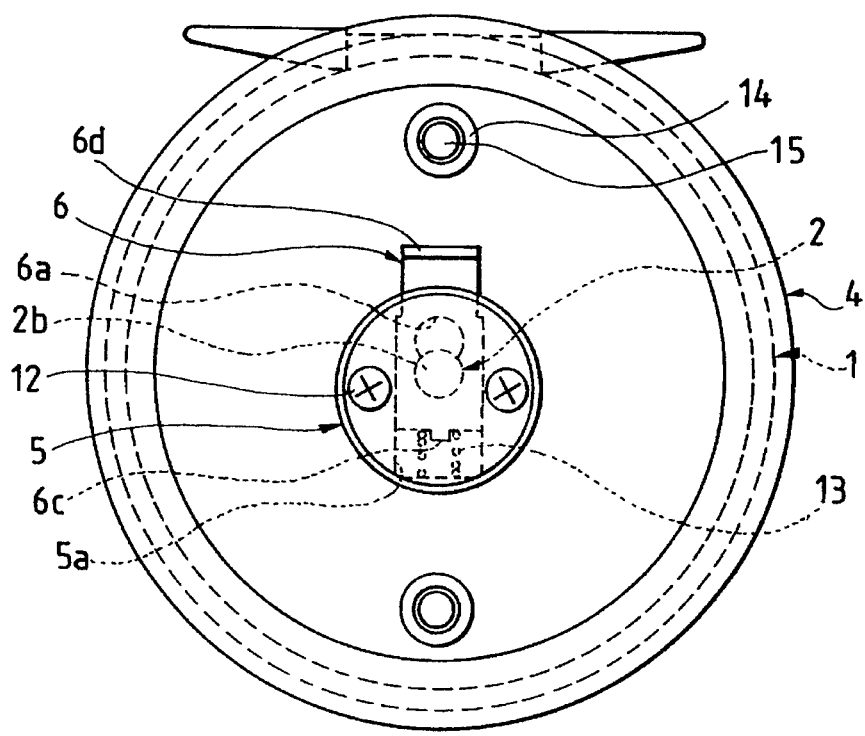
FIG. 2 is a front view of the fly type fishing reel according to the first embodiment of the present invention.

A cap 5 is fixed onto the center of the spool 4 with one or more screws 12 (two are shown in FIG. 2) extending through the cap 5 and threading into the spool 4. The screws 12 fixing cap 5 to the spool 4 may alternatively extend from the spool 4 and thread into the cap 5.

An engaging knob plate 6 is slidably provided between the cap 5 and the spool 4, and is urged by the action of a spring 13 to a position in which the spool 4 is axially retained on the shaft 2. The engaging knob plate 6 protrudes through a gap 5c formed in the cap 5.

The engaging knob plate 6 cooperatively engages a peripheral groove 2c formed near a fore end portion 2b of the shaft 2. An aperture 6a sized to loosely circumscribe the outer diameter of the fore end portion 2b, and an aperture 6b sized to loosely circumscribe the diameter of the groove 2c, communicate with one another.

A protrusion 6c formed at one end of the engaging knob plate 6 cooperates with the aforementioned spring 13, and a bent portion 6d formed at the opposite end of the engaging knob plate 6 provides an operating grip for a finger of the angler.

A concave portion 5a of the cap 5 which accommodates the fore end portion 2b of the shaft 2 is formed on the side of the cap 5 facing the spool 4. A floating absorption member 7 is inserted into and fixed in a further concave portion 5b formed approximately at the center of the concave portion 5a. The fore end portion 2b of the shaft 2 comes into pressure contact with the floating absorption member 7.

Felt, or oil impregnated felt (for improved durability) may be used to make the floating absorption member 7. Alternatively, a laminate of materials such as metal, rubber and synthetic resins may compose the floating absorption member 7. The floating absorption member 7 may also be configured as a leaf spring.

A drive gear 4a is provided on the periphery of a cylindrical body of the spool 4, and one or more handle knobs 14 (two are shown in FIG. 1) are rotatably supported with respect to shaft(s) 15 mounted on an outside surface of the spool 4. The drive gear 4a meshes with transmission gears 16,17 which are rotatably supported on shafts 18,19.

The oscillating body 3 includes a long restricting arm portion 3a and two arm portions 3b, 3c. Shafts 18, 19 are fixed to the arm portions 3b, 3c.

A spring 21 is provided between a pin 20 fixed with respect to the reel main body 1, and the long restricting arm portion 3a of the oscillating body 3. Oscillation is restricted when the oscillating body 3 comes into contact with a pin-shaped engaging stopper 22 extending through a hole 1a in the reel main body 1.

Figure 5:
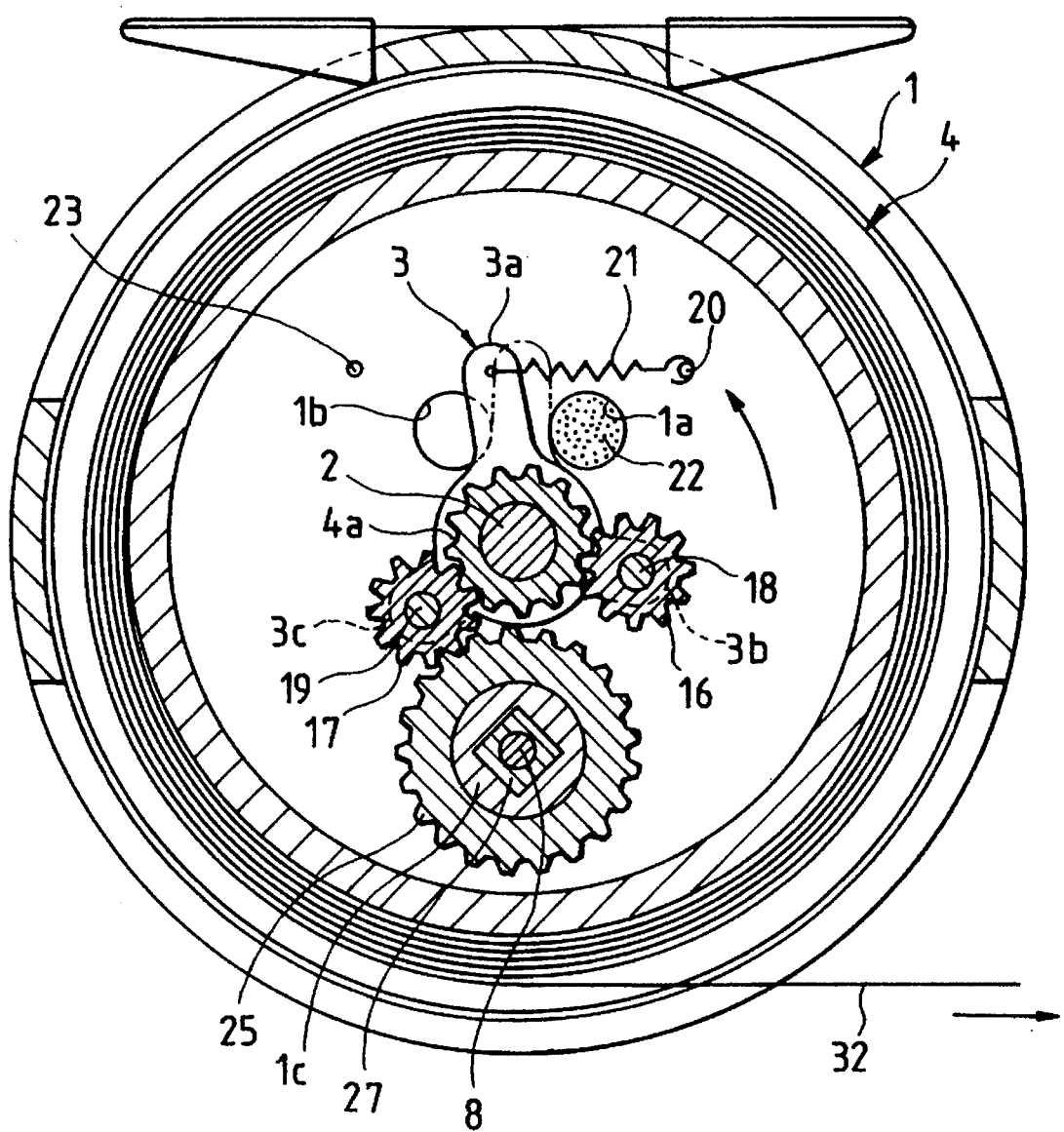
FIG. 5 is a sectional front view of a fly type fishing reel according to the first embodiment wherein a fishing line is adapted to be drawn out.

In the case where the reel is configured to be operated by a right-handed angler, the pin-shaped engaging stopper 22 extends from a hole 1a (as shown in FIG. 5). Conversely, the pin-shaped engaging stopper 22 extends from a hole 1b when the reel is configured to be operated by a left-handed angler.

Further, in the case on a left-handed angler, a pin 23 is implanted in the reel main body 1 at a position symmetrical with respect to the pin 20. The spring 21 is also transferred to extend between the pin 23 and the restricting arm portion 3a.

The pin-shaped engaging stopper 22 may be threadably engaged with the holes 1a,1b. Alternatively, a magnet may be provided at the bottom of the holes 1a,1b such that the pin-shaped engaging stopper 22 is magnetically secured to the reel main body 1.

A brake gear 25 is relatively rotatably supported on a cylindrical projection 1c of the reel main body 1. The brake gear 25 is also frictionally contiguous with a friction pad 24.

A braking knob screw shaft 8 is inserted through the cylindrical projection 1c from the outside of the reel main body 1. A braking member 27 is threadably engaged with the braking knob screw shaft 8 on the inside of the reel main body. A retaining clip 28 prevents the braking knob screw shaft 8 and braking member 27 from becoming disengaging, and a coil spring 26 biases the braking member 27 with respect to the reel main body 1.

A friction pad 29, a braking plate 30 and a leaf spring 31 are interposed between the braking member 27 and the brake gear 25. A friction pad 29 is interposed between the brake gear 25 and the braking member 27. The transmission gears 16,17 are adapted to mesh with the braking gear 25.

The spool 4 is axially displaceable with respect to the shaft 2 when the aperture 6a of the engaging knob plate 6 is concentrically aligned with the shaft 2. With the spool 4 pressed onto the shaft 2, the fore end portion 2b of the shaft 2 is received in the aperture 6a in the engaging knob plate 6.

Under the influence of spring 13, the aperture 6b of the engaging knob plate 6 is urged into concentric alignment with the shaft 2 by engaging the peripheral groove 2c of the shaft 2. In this position, the spool 4 is axially retained between the reel main body 1 and the engaging knob plate 6.

With the spool 4 axially pushed onto the shaft 2, the fore end portion 2b of the shaft 2 is pushed into the floating absorption member 7. The pushing is released concurrently with engagement between the peripheral groove 2c and the aperture 6b. An axial facing surface of the engaging knob plate 6 is held contiguous with an axial facing wall of the peripheral groove 2c, and the remaining play between the engaging knob plate 6 and the peripheral groove 2c is absorbed by the floating absorption member 7.

The natural thickness the floating absorption member 7 is set to be greater than the anticipated axial play between the engaging knob plate 6 and the shaft 2. In the case where the floating absorption member 7 is maximally compressed, the thickness of the floating absorption member 7 is set to be less than the anticipated axial play between the engaging knob plate 6 and the shaft 2.

The operation of the fly type fishing reel according to the present invention is as follows. When the spool 4 is rotated clockwise under the conditions illustrated in FIG. 5, a force is applied to the oscillating body 3 causing it to be pivoted clockwise. However, pivotal movement of the oscillating body 3 is restricted by contact between the restricting arm portion 3a and the pin-shaped engaging stopper 22 in the hole 1a.

Since the rotation of the oscillating body 3 is restricted, neither of the transmission gears 16,17 are able to mesh with the braking gear 25. Consequently, the spool 4 is not braked, but instead is rotated by the load of a fishing line 32.

Conversely, when the spool 4 is rotated counterclockwise by the fishing line 32 being drawn out of the fly type fishing reel, the oscillating body 3 is pivoted counterclockwise by the rotation of the spool 4. Concurrently, the transmission gear 17 is meshed with the braking gear 25, such that the spool 4 is braked.

For left-handed operation, the pin-shaped engaging stopper 22 is engaged in the hole 1b, and the spring 21 is transferred to extend between the pin 23 and the restricting arm portion 3a. In this case, the fishing line 32 is also reversely wound around the spool 4.

With the spool 4 rotated counterclockwise, a force is applied to the oscillating body 3 causing it to pivot counterclockwise. However, pivotal movement of the oscillating body 3 is restricted by contact between the restricting arm portion 3a and the pin-shaped engaging stopper 22 in the hole 1b.

Since the rotation of the oscillating body 3 is restricted, neither of the transmission gears 16,17 are able to mesh with the braking gear 25. Consequently, the spool 4 is not braked, but instead is rotated by the load of a fishing line 32.

Then, when the spool 4 is rotated clockwise by the fishing line 32 being drawn out of the fly type fishing reel, the oscillating body 3 is pivoted clockwise by the rotation of the spool 4. Concurrently, the transmission gear 16 is meshed with the braking gear 25, such that the spool 4 is braked.

Figure 6:
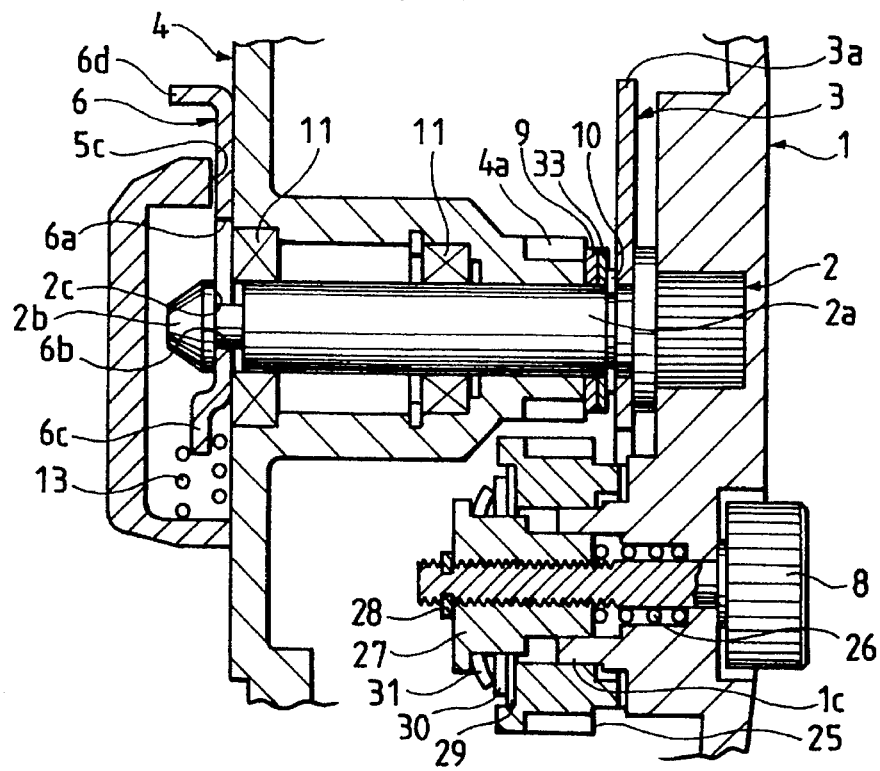
FIG. 6 is an enlarged sectional side view of an essential portion of a fly type fishing reel according to a second embodiment of the present invention.
Figure 7:
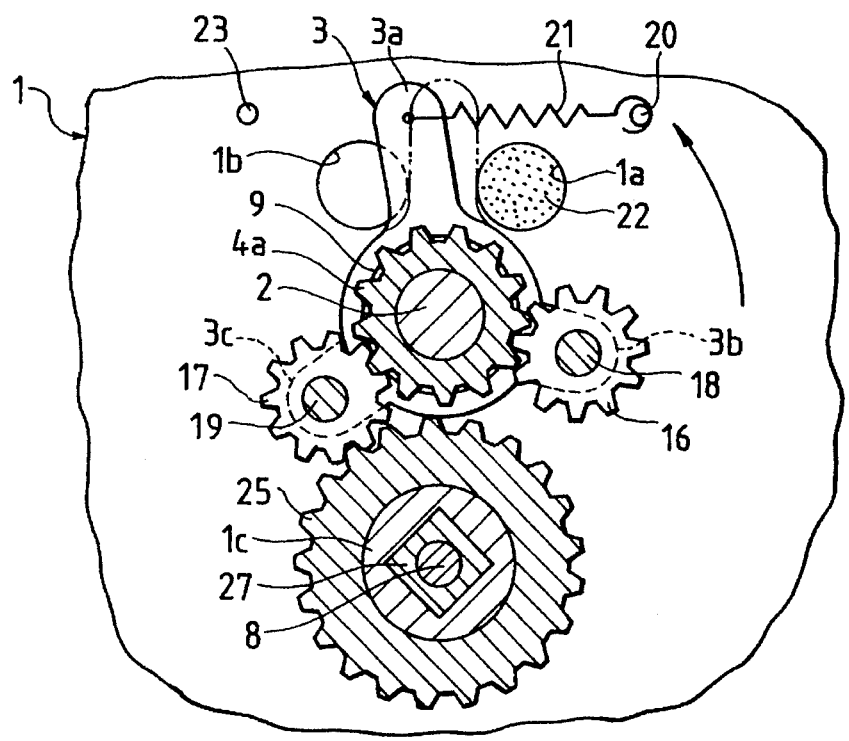
FIG. 7 is an enlarged sectional front view of an essential portion of a fly type fishing reel according to the second embodiment of the present invention.

Referring to FIGS. 6 and 7 showing the second embodiment, axial displacement of the oscillating body 3 with respect to the shaft 2 is still restricted by retaining clip 10. A washer 33 and an annular floating absorption member 9 are interposed between the spool 4 and the retaining clip 10.

Another washer may also be provided between the annular floating absorption member 9 and the drive gear 4a, and the annular floating absorption member 9 may be interposed between this washer and the aforementioned washer 33.

With the spool 4 axially pushed onto the shaft 2, the drive gear 4a end of the spool 4 is pushed against the annular floating absorption member 9. The pushing is released concurrently with engagement between the peripheral groove 2c and the aperture 6b. An axial facing surface of the engaging knob plate 6 is held contiguous with an axial facing wall of the peripheral groove 2c, and the remaining play between the engaging knob plate 6 and the peripheral groove 2c is absorbed by the annular floating absorption member 9.

With a fly type fishing reel constructed in accordance with either embodiment of the present invention, an axial facing surface of the engaging knob plate 6 is held contiguous with an axial facing wall of the peripheral groove 2c, and the remaining play between the engaging knob plate 6 and the peripheral groove 2c is absorbed by the resilience of either the floating absorption member 7 or the annular floating absorption member 9. Therefore, the problem of play existing in the axial direction between the shaft 2 and the spool 4 can be overcome, and the occurrence of noise caused by backlash can be avoided during the winding operation of the fly type fishing reel.

Even when the manufacturing accuracy is low, backlash can be absorbed. Therefore, the dimensions can be easily controlled and the production cost can be reduced.

Further, play as a consequence of wear can be absorbed by the floating absorption members 7 and 9, so that the operation can be continued over a long period of time without the occurrence of backlash.

When the floating absorption members 7 and 9 are made of felt, particularly oil impregnated felt, rotational resistance of the spool can be reduced as well as backlash absorbed.

Figure 8:
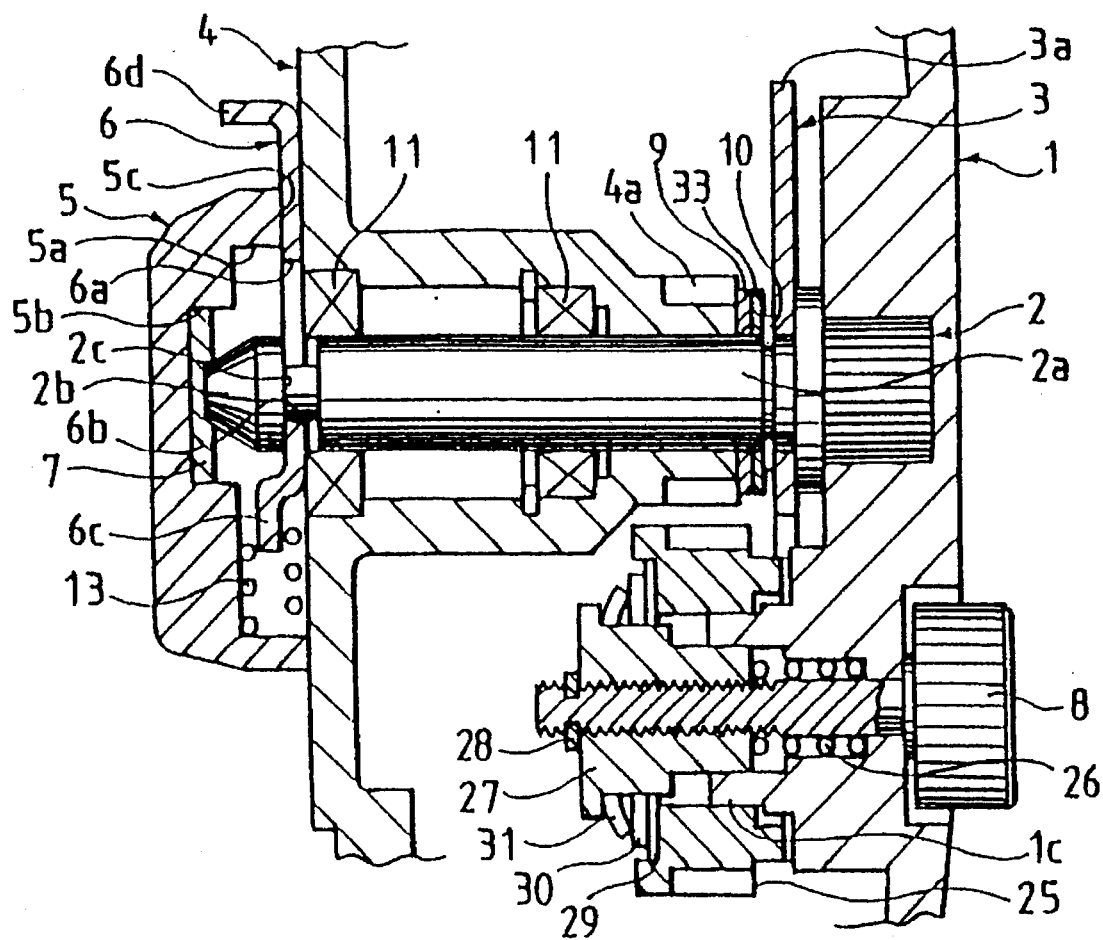
FIG. 8 is an enlarged sectional side view of an essential portion of a fly type fishing reel according to a third embodiment of the present invention.

In the above first embodiment, the floating member 7 is individually provided between the cap 5 and shaft 2, and in the second embodiment, the annular floating member 9 is individually provided between the shaft 2 and the spool 4, however, both floating absorption members 7 and 9 may be simultaneously provided as illustrated by FIG. 8.

The present invention is constructed in the simple manner described above, with the floating absorption member(s) absorbing the axial play caused between the shaft and spool, so that the occurrence of noise caused by backlash can be prevented and the winding operation can be comfortably performed.

Even with low manufacturing dimensional accuracy, backlash can be absorbed. Therefore, the dimensions can be easily controlled and the production cost can be reduced.

With respect to the wear associated with the spool, play can be absorbed by the floating absorption members, so that the operation can be continued over a long period of time without the occurrence of backlash.

What is claimed is:

1. A fly type reel for fishing, comprising:
    a spool relatively rotatably supported on a shaft, and upon which fishline is wound;
    limit means for restricting relative axial displacement of said spool with respect to said shaft;
    a cover means for covering an axial end of said shaft, said cover means being fixed to said spool in order to rotate with said spool; and
    a floating absorption means for absorbing play existing in an axial direction, said floating absorption means is positioned between said cover means and the axial end of said shaft along said axial direction.

2. The fly type reel for fishing according to claim 1, wherein said limit means include:
    a constricted groove circumscribing said shaft; and
    an engaging knob plate slidably mounted with respect to said spool, said engaging knob plate having an aperture through which said shaft extends.

3. The fly type reel for fishing according to claim 2, wherein said constricted groove has an axial width and said engaging knob plate has a thickness, said width is greater than said thickness.

4. The fly type reel for fishing according to claim 3, wherein said play is equal to said width less said thickness.

5. The fly type reel for fishing according to claim 2, wherein said engaging knob plate extends between said cover means and said spool.

6. The fly type reel for fishing according to claim 1, wherein felt is used for said floating absorption means.

7. The fly type reel for fishing according to claim 6, wherein said felt is oil impregnated.

8. The fly type reel for fishing according to claim 1, wherein said floating absorption means is a leaf spring.

9. The fly type reel for fishing according to claim 1, wherein said floating absorption means is a resilient laminated composition.

10. The fly type reel for fishing according to claim 1, wherein a retaining clip is fixed on said shaft in said axial direction, and said floating absorption means is positioned between a second retaining clip and said spool.

11. The fly type reel for fishing according to claim 10, further comprising a washer positioned between said retaining clip and said floating absorption means.

12. A fly type reel for fishing, comprising:
    a spool relatively rotatably supported on a shaft, and upon which fishline is wound;
    limit means for restricting relative axial displacement of said spool with respect to said shaft;
    a cover means for covering an axial end of said shaft, said cover means being fixed to said spool; and
    a floating absorption means for absorbing play existing in an axial direction, said floating absorption means is positioned between said spool and said shaft;
    wherein said floating absorption means comprises a first absorbing member positioned between said axial end and said cover means, and a second absorbing member positioned between said spool and a retaining clip fixed on said shaft in said axial direction.

* * * * *